United States Patent
Han

(10) Patent No.: US 12,240,119 B2
(45) Date of Patent: Mar. 4, 2025

(54) MOTION CONTROL METHOD, ROBOT, AND COMPUTER-READABLE STORAGE MEDIUM

(71) Applicant: UBTECH ROBOTICS CORP LTD, Shenzhen (CN)

(72) Inventor: Gang Han, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 378 days.

(21) Appl. No.: 17/984,215

(22) Filed: Nov. 9, 2022

(65) Prior Publication Data

US 2023/0191600 A1 Jun. 22, 2023

(30) Foreign Application Priority Data

Dec. 22, 2021 (CN) .......................... 202111583810.0

(51) Int. Cl.
   *B25J 9/16* (2006.01)
(52) U.S. Cl.
   CPC .................................. *B25J 9/1658* (2013.01)
(58) Field of Classification Search
   CPC .................. B25J 9/1658; B25J 9/1664; G05B 2219/40519
   See application file for complete search history.

(56) References Cited

U.S. PATENT DOCUMENTS

| | | | | |
|---|---|---|---|---|
| 9,579,789 B2* | 2/2017 | Passot | ..................... | G06N 3/008 |
| 11,468,310 B2* | 10/2022 | Pham | ..................... | G06N 5/04 |
| 12,134,194 B2* | 11/2024 | Xie | ..................... | B62D 57/032 |
| 2010/0152899 A1* | 6/2010 | Chang | .................... | B25J 9/1682 |
| | | | | 700/262 |
| 2012/0259463 A1* | 10/2012 | Orita | ..................... | B62D 57/00 |
| | | | | 901/1 |
| 2021/0089275 A1* | 3/2021 | Dey | ..................... | G06N 3/045 |
| 2022/0245109 A1* | 8/2022 | Hatami-Hanza | ......... | G06N 7/01 |
| 2023/0068699 A1* | 3/2023 | Otsuka | .................... | G06F 17/12 |

(Continued)

OTHER PUBLICATIONS

"Recursive Hierarchical Projection for Whole-Body Control with Task Priority Transition"; Gang Han, Jiajun Wang, Xiaozhu Ju, and Mingguo Zhao; 2022 IEEE/RSJ International Conference on Intelligent Robots and Systems (IROS), Oct. 23-27, 2022, Kyoto, Japan. (Year: 2022).*

*Primary Examiner* — Jason Holloway
*Assistant Examiner* — Madison B Emmett

(57) ABSTRACT

A motion control method, a robot, and a computer-readable storage medium are provided. The method includes: calculating a task matrix and expected information of each task of the robot based on reference trajectory information of each task of the robot in a control period and state estimation information of each task of the robot in the control period; calculating a constraint matrix and a boundary of an inequality constraint that the robot needs to satisfy based on the state estimation information; constructing a hierarchical quadratic programming problem with recursive hierarchical projection based on all the information obtained above, a real-time determined weight coefficient of each task, and a real-time determined priority level of each task: and solving the hierarchical quadratic programming problem to obtain a result, and generating a joint control instruction for controlling each joint of the robot to move.

20 Claims, 3 Drawing Sheets

(56) References Cited

U.S. PATENT DOCUMENTS

| | | | | |
|---|---|---|---|---|
| 2023/0101489 A1* | 3/2023 | Liu | ........................ | B25J 9/1643 |
| | | | | 700/253 |
| 2023/0381963 A1* | 11/2023 | Yan | ....................... | G05B 19/423 |
| 2024/0261964 A1* | 8/2024 | Englsberger | ........... | B25J 9/1607 |

* cited by examiner

MOTION CONTROL METHOD, ROBOT, AND COMPUTER-READABLE STORAGE MEDIUM

CROSS REFERENCE TO RELATED APPLICATIONS

The present disclosure claims priority to Chinese Patent Application No. 202111583810.0, filed Dec. 22, 2021, which is hereby incorporated by reference herein as if set forth in its entirety.

BACKGROUND

1. Technical Field

The present disclosure relates to robot control technology, and particularly to a motion control method, a robot, and a computer-readable storage medium.

2. Description of Related Art

A robot can only interact with and get along with humans harmoniously when integrated into the dynamic and unstructured environment in which humans live. When the robot is operated in the environment, it needs to take into account the physical and environmental constraints of each part of its body so as to synthesize the motion of the entire body, thereby achieving a variety of tasks at the same time. For example, a redundant robot often needs to achieve the manipulation tasks of arm under the condition of satisfying physical constraints (which include, for example, maintaining balance, limits for avoiding joint impact, and the like), and needs to have functions such as avoiding obstacle collisions and responding to drags of external forces softly. When the robot performs complex tasks, it needs to dynamically adjust the priority level of different tasks according to the actual situation, so that the robot can adjust its own motion in time according to the changed priority level, and apply more degrees of freedom (DOF) to the tasks with higher priority level.

In the prior art, it mainly expresses the mapping relationship between the tasks expected to be achieved by the robot and the joint instructions (e.g., displacement, velocity, or torque instructions) in a unified mathematical form, and realizes using, through the null space projection (NSP) method or the convex quadratic programming (QP) method, the remaining degrees of freedom to solve low-priority tasks without affecting the execution effect of high-priority tasks, so as to solve the tasks of each priority level in turn until the final control solving result is obtained.

However, the above-mentioned prior art reflects a complete projection relationship, which cannot directly reflect the continuous change of the degrees of freedom required by each task when the priority level of the task is adjusted. This will affect the stability of the operation of the robot and the execution effect of tasks when the priority level of tasks is adjusted.

BRIEF DESCRIPTION OF THE DRAWINGS

To describe the technical schemes in this embodiment or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions provided by the present disclosure, specific embodiments are used as follows.

Figure 1:
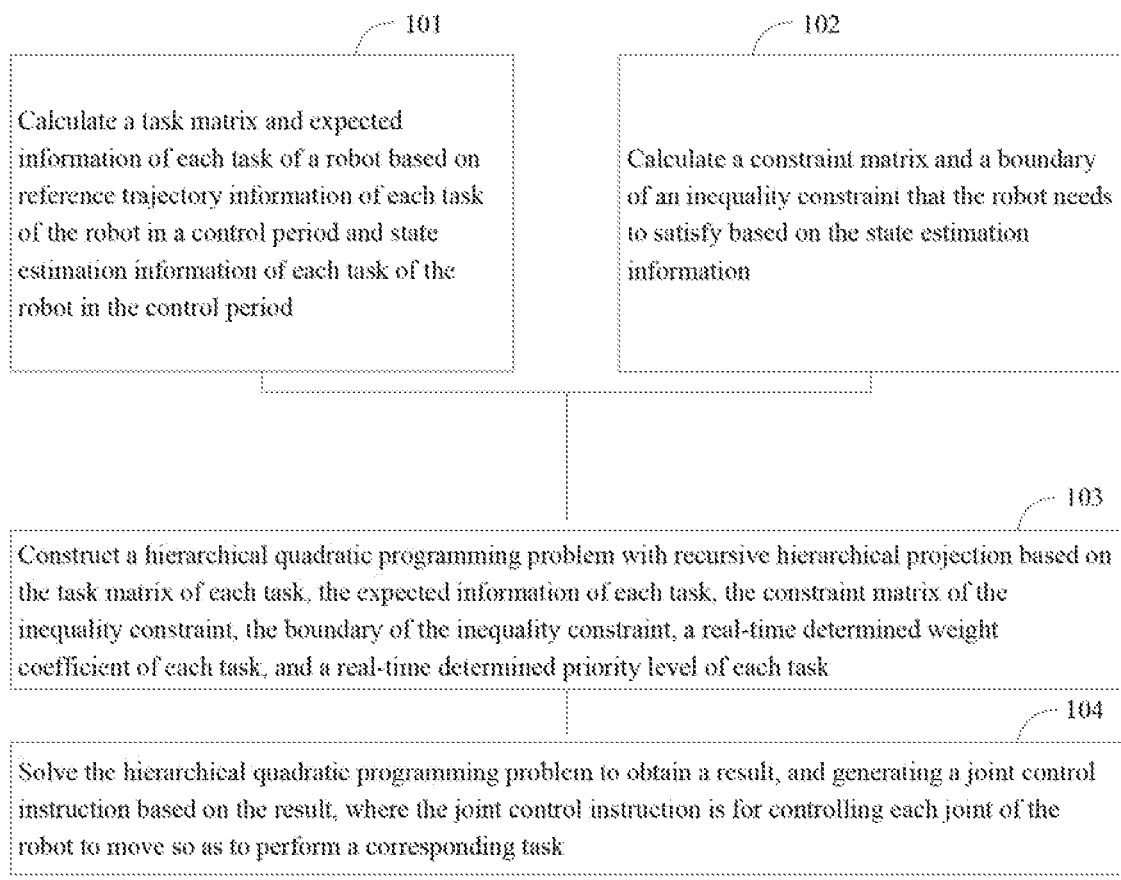
FIG. 1 is a flow chart of a motion control method according to an embodiment of the present disclosure.

FIG. 1 is a flow chart of a motion control method according to an embodiment of the present disclosure. In this embodiment, a computer-implemented motion control method is provided. The motion control method is applied to (a processor of) a robot. The robot may be, for example, a series/parallel configuration robot that has position-controlled joints, force-controlled joints, or force-position hybrid control joints, or be a robotic arm, quadruped robot or humanoid robot used in various fields such as industry, services and specialties. The robot may include arm(s) and/or leg(s), each of which has a series of joints. The specific type of the robot is not limited here, that is, the motion control method has good adaptability. In other embodiments, the method may be implemented through a motion control apparatus shown in FIG. 2 or a robot shown in FIG. 3. As shown in FIG. 1, in this embodiment, the motion control method may include the following steps.

101: calculating a task matrix and expected information of each task of the robot based on reference trajectory information of each task of the robot in a control period and state estimation information of each task of the robot in the control period.

In this embodiment, the process of the motion of the robot may be divided into a plurality of control cycles. For each control cycle, the method of this embodiment may be implemented to realize the control of the robot in the current control cycle.

In the current control cycle, the reference trajectory information including, for example, reference position $\xi_{ref}$, reference velocity $\dot{\xi}_{ref}$, and/or reference acceleration $\ddot{\xi}_{ref}$ of each task that the robot needs to perform may be obtained based on a motion plan of a host computer of the robot.

The robot may also obtain real-time state feedback information including, for example, the current actual position $q_{set}$, the actual velocity $\dot{q}_{act}$, the actual acceleration $\ddot{q}_{act}$, of the joint, and/or the like, of the robot at the current moment through sensors such as the angle encoder of motor, the force sensor and/or the inertial accelerometer. Then, the state estimation information including, for example, the estimated position $\xi_{est}$ and estimated velocity $\dot{\xi}_{est}$ of an end of an arm of the robot, of each task of the robot in a task space may be obtained through the forward kinematics of the robot and a preset dynamics model.

It can be understood that the various tasks that the robot needs to perform, for example, the motion of the end of a robotic arm, the motion of the centroid (center of mass) of a robot, or the rotation of the posture of the upper body of a humanoid robot, can be expressed by equations, that is, each task of the robot is actually an equational task. After obtaining the reference trajectory information of each task of the robot in the current control cycle and the state estimation information of the task of the robot in the current control cycle, the robot can express each task as a unified mathematical form based on the established robot kinematics and dynamics models. Specifically, if the number of tasks that the robot needs to perform is $n_t$, the i-th (i=0, . . . , $n_t$) task may be expressed as the mathematical form of the following equation (1):

$$A_i x = b_i \quad (1)$$

where, $A_i$ represents a transfer matrix of the i-th task (i.e., the task matrix), and the size of $A_i$ is related to the obtained real-time state feedback information of the joint of the robot; $b_i$ represents the expected information of the i-th task, and the magnitude of $b_i$ is related to the obtained reference trajectory information of the task space of the robot and the obtained state estimation information; X represents the control information of the joint that needs to be solved. It can be understood that for robots using force-controlled joints, X is usually the joint acceleration $\ddot{q}$. After the optimized joint acceleration $\ddot{q}_{opt}$ is solved, the torque instruction $\tau_{opt}$ at the joint can be obtained through a dynamic model. For robots using position-controlled joints, X is usually the joint velocity $\dot{q}$. After solving the optimized joint velocity $\dot{q}_{opt}$, the position instruction $q_{opt}$ of the joint can be obtained through integration.

By solving each part in equation (1), the task matrix and the expected information of each task can be obtained. For ease of understanding, a tracking task of the trajectory of an end of an arm of a force-controlled robot is taken as an example for describing as follows.

According to the real-time state feedback information of the joint, based on the constructed inverse kinematics model of the robot, a Jacobian matrix J of the end of the arm and its derivative $\dot{J}$ can be obtained, and the relationship between the acceleration of the joint and an end acceleration can be obtained as the following equation (2):

$$J\ddot{q} = \ddot{\xi} - \dot{J}\dot{q} \quad (2)$$

According to the relationship in equation (2), when the task is expressed in the mathematical form of equation (1), x is the joint acceleration $\ddot{q}$, the task matrix $A_i$ of the tracking task of the trajectory of the end of the arm is the above-mentioned Jacobian matrix J, and the expected information $b_i$ of the tracking task of the trajectory of the end of the arm is the expected information $\ddot{\xi} - \dot{J}\dot{q}$ of the end of the arm. In order to improve the execution accuracy and effect of the task of the robot, a feedback controller may be introduced to solve $b_i$ as the following equation (3):

$$b_i : \ddot{\xi}_{ref} + K_p(\xi_{ref} - \xi_{est}) + K_d(\dot{\xi}_{ref} - \dot{\xi}_{est}) - \dot{J}\dot{q}_{act} \quad (3)$$

where, $K_p$ and $K_d$ are the position gain and the velocity gain, respectively, in the feedback control law. Through the feedback control law, the deviation between the actual position and velocity of the robot in the task space, and the planned reference value can be taken into account, which ensures the execution accuracy of the task of the robot.

Through the forgoing process, all the equational tasks that the robot needs to perform are expressed in the form of equation (1), which lays the foundation for the unified solving of the multi-objective optimization problem that is to be constructed later.

102: calculating a constraint matrix and a boundary of an inequality constraint that the robot needs to satisfy based on the state estimation information.

In this embodiment, all the inequality constraints that the robot needs to satisfy in the current control cycle may be determined first. For example, if the number of the inequality constraints that the robot needs to satisfy is set as $n_c$, the i-th (i=0, . . . , and $n_c$) inequality constrain may be expressed as the mathematical form as the following equation (4):

$$C_i x \leq d_i \quad (4)$$

where, $C_i$ represents the transfer matrix (i.e., the constraint matrix) of the i-th inequality constraint; and $d_i$ represents the boundary of the i-th inequality constraint. The parameter x has been explained previously, which will not be repeated herein.

By solving each part in equation (4), the constraint matrix and boundary of each inequality constraint can be obtained. Specifically, the solving of the constraint matrix and the boundary only depends on the state estimation information.

For ease of understanding, the joint torque constraints that the robot needs to meet is taken as an example for describing as follows.

The torque of a joint driven by the robot cannot exceed the maximum torque of the joint. Based on this, according to the inverse dynamics modeling method of the robot, the inverse dynamics equation of the robot can usually be expressed as the mathematical form as the following equation (5):

$$\tau = M\ddot{q} + \tau_c + \tau_g - J^T F \quad (5)$$

where, M represents the calculated inertia matrix of the robot; $\tau_c$ represents the calculated torque generated by the Coriolis force of the robot; $\tau_g$ represents the calculated torque generated by the gravity of the robot; $J^T F$ represents the calculated torque generated by the external force on the robot. The parameter $\ddot{q}$ has been explained previously, which will not be repeated herein. Based on the forgoing parameters, the inequality relation in equation (4) can be expressed as the mathematical form as the following equation (6):

$$\tau_{min} - \tau_c - \tau_g + J^T F \leq M\ddot{q} \leq \tau_{max} - \tau_c - \tau_g + J^T F \quad (6)$$

Then, the constraint matrix of the inequality constraint can be calculated as $$C_i = \begin{bmatrix} M \\ -M \end{bmatrix};$$

and the boundary of the inequality constraint can be calculated as $$d_i = \begin{bmatrix} \tau_{max} - \tau_c - \tau_g + J^T F \\ -(\tau_{min} - \tau_c - \tau_g + J^T F) \end{bmatrix}.$$

It should be noted that through steps 101-102, the robot can obtain the task matrix and expected information of all the tasks in real time, and can obtain the constraint matrix and boundary of all the inequality constraints at the same time.

103: constructing a hierarchical quadratic programming problem with recursive hierarchical projection based on the task matrix of each task, the expected information of each task, the constraint matrix of the inequality constraint, the boundary of the inequality constraint, a real-time determined weight coefficient of each task, and a real-time determined priority level of each task.

In this embodiment, in order to optimally solve a multi-task and multi-constraint control problem, the tasks and the constraints may be layered according to priorities. Specifically, the higher the priority, the higher the level of the tasks and the constraints, thus forming the concept of priority level. It can be understood that the priority level and the priority are substantially the same concept. After that, the robot may solve the optimization problem composed of high-level tasks and constraints preferentially, and on the basis of the obtained optimization results, superimpose the optimization results of the subsequent levels layer by layer. That is, the optimization problem composed of the tasks and constraints with higher priority levels is solved first, and then the optimization results of lower priority levels are superimposed layer by layer according to the order of priority levels from high to low so as to obtain the final optimization result.

During the motion of the robot, the priority level of each task will be adjusted as the state of the robot changes. Therefore, the priority level of all the tasks may be planned according to the application requirements. For example, the priority level of each task may be obtained by real-time planning through a finite state machine (FSM). Considering that there may be more than two tasks at the same priority level, for the relative importance of the tasks at the same priority level, the corresponding weight coefficient should be set for the tasks at the same priority level according to actual needs and experience.

In addition, the priority level of each inequality constraint may be obtained. It should be noted that the priority level of each inequality constraint is a preset fixed value, that is, before the robot starts to move, the priority level of each inequality constraint has been set, and the priority level of each inequality constraint will not change during the motion of the robot. It can be understood that, there may be more than two inequality constraints set at the same priority level, which is not limited herein.

In some embodiments, in order to make the robot to automatically solve according to the priorities of the tasks determined in real time and automatically match the degrees of freedom required by different tasks, the priority level of each task can be expressed in the form of a matrix, so that the robot can easily perform calculations. That is, a task priority matrix may be determined through the real-time determined priority level of each task, and then a hierarchical quadratic programming problem (i.e., QP problem) with recursive hierarchical projection may be constructed based on the task matrix of each task, the expected information of each task, the constraint matrix of each inequality constraint, the boundary of each inequality constraint, the priority level of each inequality constraint, the currently determined weight coefficient of each task and the currently determined task priority matrix. Specifically, the task priority matrix may be as the following equation (7):

$$\Psi = \begin{bmatrix} \alpha_{1,1} & & \alpha_{1,n_t} \\ & \ddots & \\ \alpha_{n_l,1} & & \alpha_{n_l,n_t} \end{bmatrix} \in R^{n_l \times n_t}. \tag{7}$$

where, $n_l$ is the number of priority levels; $n_t$ is the number of tasks; the range of the value of the elements in the task priority matrix is 0-1, and its magnitude reflects the priority of the corresponding task. Specifically, the choice of the value of an element follows the following basic rules:

1) the elements of different rows in the j-th column satisfy the relative relationship of $\alpha_{k,j} \leq \alpha_{i,j} (k \leq i)$; and 2) when the priority level of the j-th task is i, then $$\alpha_{k,j} \begin{cases} = 0, k < i \\ = 1, k = i \end{cases},$$

and it can be known based on the basic rule (1) that $\alpha_{k,j}=1, (k>i)$.

From this, it can be known that when the priority level of the j-th task is i, $$\alpha_{k,j} \begin{cases} = 0, k < i \\ = 1, k \geq i \end{cases}.$$

For example, if $n_l$ is 5 and $n_t$ is 8, the 1-st and 4-th tasks have the priority levels of 1, the 3-rd and 6-th tasks have the priority levels of 2, the 2-nd task has the priority level of 3, the 7-nd task has the priority level of 4, and the 5-st and 8-th tasks have the priority levels of 5, then the obtained task priority matrix will $$\begin{bmatrix} 1 & 0 & 0 & 1 & 0 & 0 & 0 & 0 \\ 1 & 0 & 1 & 1 & 0 & 1 & 0 & 0 \\ 1 & 1 & 1 & 1 & 0 & 1 & 0 & 0 \\ 1 & 1 & 1 & 1 & 0 & 1 & 1 & 0 \\ 1 & 1 & 1 & 1 & 1 & 1 & 1 & 1 \end{bmatrix}.$$

Since the priority level of each task is constantly changing, the task priority matrix will change correspondingly based on the real-time determined priority level of each task. Based on this, the forgoing step of "determining the task priority matrix through the real-time determined priority level of each task" may include:

in response to the priority level of the j-th task being raised from the i-th layer to the k-th layer, setting all the elements from the k-th row to the i−1-th row in the j-th column of the above-mentioned task priority matrix to change smoothly from 0 to 1 within a preset duration;

in response to the priority level of the j-th task being lowered from the i-th layer to the k-th layer, setting all the elements from the i-th row to the k−1-th row in the j-th column of the above-mentioned task priority matrix to change smoothly from 1 to 0 within the above-mentioned preset duration;

in response to the j-th task being removed from the i-th row, setting all the elements from the i-th row to the n-th row in the j-th column of the above-mentioned task priority matrix to change smoothly from 1 to 0 within the above-mentioned preset duration; and in response to the j-th task being inserted into the i-th row, setting all the elements from the i-th row to the $n_l$-th row in the j-th column of the above-mentioned task priority matrix to change smoothly from 0 to 1 within the above-mentioned preset time period.

In which, the removing the j-th task from the i-th row may be that the execution of the j-th task (i.e., changing the j-th task from the execution state to the non-execution state) is currently suspended or terminated, while the priority level of the j-th task is i before suspending or terminating the execution; the inserting the j-th task into the i-th row may be that the execution of the j-th task (i.e., changing the j-th task from the non-execution state to the execution state) is currently started or resumed, while the priority level of the j-th task is i after starting or resuming the execution. If the priority level of the j-th task is updated at time $T_0$, the process of smoothly changing the corresponding elements that need to be changed within the preset time period will be: from time $T_0$ to time $T_1$ (the preset time period is passed from time $T_0$ to time $T_1$), all the corresponding elements that need to be changed gradually change over time by, for example, starting from time $T_0$, increasing from 0 to a decimal between 0 and 1, and finally increasing to 1 at time $T_1$; or starting from time $T_0$, decreasing from 1 to a decimal between 0 and 1, and finally decreasing to 0 at time $T_1$. It can be seen that with the change of the execution state of the task or the continuous adjustment of the priority level of the task, the task priority matrix will also be changed smoothly.

It can be understood that the larger the element $\alpha_{i,j}$ in the task priority matrix is, the more degrees of freedom the j-th task occupies in the i-th layer, that is, the less residual degrees of freedom left for the tasks at the subsequent priority levels.

So far, all the information needed to construct the above-mentioned hierarchical quadratic programming problem has been obtained, which includes the task matrix and expected information of each task, the constraint matrix and boundary of each inequality constraint, the real-time determined task priority matrix (which is obtained through the priority level of each real-time determined task), the weight of each real-time determined task, and the priority level of each inequality constraint. Based on all the information obtained above, the robot may construct the task and constraint of each layer as the hierarchical quadratic programming problem with recursive hierarchical projection. In which, the optimization result of the first i layer of the optimization problem is as the following equation (8):

$$x_i^* = \begin{cases} P_{i-1} u_i^*, & (i = 1) \\ x_{i-1}^* + P_{i-1} u_i^*, & (i = 2, \ldots, n_t) \end{cases} \quad (8)$$

where, $x_i^*$ represents the optimization result of the first i layer of the optimization problem; $x_{i-1}^*$ represents the optimization result of the first i−1 layer of the optimization problem; $P_{i-1} u_i^*$ represents an increment of the optimization result of the first i layer of the optimization problem with respect to the optimization result of the first i−1 layer of the optimization problem. It can be seen from the above-mentioned equation (8) that the final optimization result can be obtained by solving and superimposing layer by layer from the first layer, and $P_{i-1} u_i^*$ can be obtained by solving the hierarchical quadratic programming problem of the i-th layer as the following equation (9):

$$\min_{u_i, v_i} \left\| A_i^{A,s}(x_{i-1}^* + P_{i-1} u_i) - \hat{b}_i^{A,s} \right\|_{\hat{W}_i^{A,s}}^2 + \|v_i\|^2 \quad (9)$$

$$\text{s.t.} \quad \underline{d}_i^A \leq C_i^A(x_{i-1}^* + P_{i-1} u_i) + v_i \leq \overline{d}_i^A$$

$$\underline{d}_{i-1}^A \leq C_{i-1}^A(x_{i-1}^* + P_{i-1} u_i) + v_{i-1}^* \leq \overline{d}_{i-1}^A$$

$$\vdots$$

$$\underline{d}_1^A \leq C_1^A(x_{i-1}^* + P_{i-1} u_i) + v_1^* \leq \overline{d}_1^A$$

where, $u_i$ represents an optimization variable; $v_i$ represents a slack variable; $A_i^{A,s}$ represents an augmented task matrix of the i-th layer, which is determined through the above-mentioned task matrix and the above-mentioned real-time determined priority level of each task; $P_{i-1}$ represents a recursive hierarchical projection matrix of the i-th layer; $\hat{b}_i^{A,s}$ represents a modified augmented expected information of the i-th layer, which is determined through the expected information and the real-time determined priority level of each task; $\hat{W}_i^{A,s}$ represents a modified augmented weight matrix of the i-th layer, which is determined through the above-mentioned real-time determined weight coefficient of each task and the above-mentioned real-time determined priority level of each task; $C_i^A$ represents an augmented constraint matrix of the i-th layer, which is determined through the above-mentioned constraint matrix and a priority level of each preset inequality constraint; $\underline{d}_i^A$ represents an augmented lower boundary matrix of the i-th level and $\overline{d}_i^A$ represents an augmented upper boundary matrix of the i-th level, which are determined through the above-mentioned boundary of the inequality constraint and the priority level of the preset inequality constraint.

Specifically, in conjunction with the above-mentioned task priority matrix that is obtained based on the real-time determined priority level of each task, each parameter will be explained and described in detail below.

For $A_i^{A,s}$, the task matrix of all the tasks with the priority level of i may be obtained first, and then these task matrices may be obtained after sorting according to the magnitude of the corresponding elements in the i-th row of the task priority matrix $\Psi$ in descending order (because the priority level of the tasks may be adjusted to cause the elements in the task priority matrix to be adjusted accordingly, not all the tasks with the priority level of i will have the corresponding element in the i-th row that has the magnitude of 1, as shown in the following equation (10):

$$A_i^{A,s} = \left[ A_{s_1}^T, \ldots, A_{s_{n_i}}^T \right]^T, \quad (10)$$

where, the subscript S is the sequence number of the task whose priority order is i, and the task matrix of these tasks has been obtained through step 101.

For $P_{i-1}$, it may be obtained according to the augmented task matrix $A_{i-1}^{A,s}$ of the i−1-th layer, the recursive hierarchical projection matrix $P_{i-2}$ of the i−2-th layer, and the elements of the i−1-th row of the task priority matrix $\Psi$ as shown in the following equation (11):

$$P_{i-1} = P_{i-2}\left(I - Q_{i-1}^{A,s,r\,T} Q_{i-1}^{A,s,r}\right), \quad (11)$$

where, $Q_{i-1}$ is the row space orthonormal basis of $A_{i-1}^{A,s}$, which can be obtained by performing orthogonal-triangular decomposition (i.e., QR decomposition) after extracting linearly independent rows from $A_{i-1}^{A,s}$. The row space orthonormal basis reflects the execution direction of the task of the i−1-th layer. $A_{i-1}^{A,s,r}$ is extracted from the diagonal matrix $A_{i-1}^{A,s}$ which is shown as the following equation (12):

$$A_{i-1}^{A,s} = \begin{bmatrix} \alpha_{i-1,s_1} I_{d_1} & & \\ & \ddots & \\ & & \alpha_{i-1,s_{n_{i-1}}} I_{d_{s_{n_{i-1}}}} \end{bmatrix}, \quad (12)$$

The diagonal elements of the diagonal matrix $A_{i-1}^{A,s}$ are all taken from the columns corresponding to the i−1-th row of the task priority matrix, and $A_{i-1}^{A,s,r}$ extracts the diagonal element of the corresponding position $A_{i-1}^{A,s}$ according to the row numbers of the linearly independent rows so as to form a simplified diagonal element matrix. It can be understood that $A_{i-1}^{A,s,r}$ reflects the degree of occupation of the task in the degree of freedom of the execution direction represented by $Q_{i-1}$. If the element of the task in the task priority matrix is 1, it means that the task is in the i−1-th layer, and the diagonal element in this time will be also 1, so the task will completely occupy the degree of freedom of the corresponding execution direction of $Q_{i-1}$, so that the recursive hierarchical projection matrix obtained by the forgoing method can enable the subsequent tasks to be solved only in the remaining degrees of freedom. If the task element in the task priority matrix smoothly changes from 1 to 0, it indicates that the task is gradually being removed from the i−1-th layer, and the diagonal elements in will also gradually change from 1 to 0, then the task will gradually release the occupation of the corresponding degrees of freedom, so that the recursive hierarchical projection matrix $P_{i-1}$ obtained through the forgoing method can make the subsequent tasks to gradually solve using the degrees of freedom released by the task.

For $\hat{b}_i^{A,s}$, the expected information of all the tasks with the priority level of i may be obtained first, then the augmented expected information $b_i^{A,s}$ of the tasks of the i-th layer may be obtained after sorting according to the magnitude of the corresponding elements in the i-th row of the task priority matrix $\Psi$ in descending order, and finally $\hat{b}_i^{A,s}$ may be obtained after performing the correction of linearized processing, as the following equation (13):

$$\hat{b}_i^{A,s} = I_i^{A,s} b_i^{A,s} + \left(-I_i^{A,s}\right)_i^{A,s*} \, {}_{i-1}, \quad (13)$$

In this way, when the priority is adjusted, the continuous transition of the objectives of the solving task of each layer can be realized.

For $\hat{W}_i^{A,s}$, similar to the obtaining process of $\hat{b}_i^{A,s}$, the weight coefficients of all the tasks with the priority level i may be obtained first, and then the augmented coefficients of the tasks in the i-th layer may be obtained after sorting according to the magnitude of the corresponding elements in the i-th row of the task priority matrix $\Psi$ in descending order, and finally $\hat{W}_i^{A,s}$ may be obtained after the correction of the diagonal matrix, as the following equation (14):

$$\hat{W}_i^{A,s} W = I_i^{A,s} I_i^{A,s} \quad (14)$$

Thus, after the priority adjustment, the continuous transition of the weight coefficients of each task can be realized.

For $C_i^A$, $\underline{d}_i^A$ and $\overline{d}_i^A$, they are obtained based on the constraint matrix of the inequality constraint of the i-th layer (i.e., the priority level is i), the lower boundary, and the upper boundary, respectively, and the specific obtaining method is the same as that of the prior art, that is, the existing obtaining method of augmented matrix, which will not be repeated herein.

So far, a quadratic programming problem that is continuously adjustable with the task priority matrix is constructed. In which, the essential transformation of the control problem when the priority is adjusted is realized through recursive hierarchical projection, the modified augmented expected information, and the modified augmented weight matrix.

104: solving the hierarchical quadratic programming problem to obtain a result, and generating a joint control instruction based on the result, where the joint control instruction is for controlling each joint of the robot to move so as to perform a corresponding task.

In this embodiment, the robot may solve the QP problem proposed in step 104 by using an existing open-source QP optimization solver, which can usually achieve a real-time solving of 0.5-1 ms. Specifically, if the QP problem at the acceleration level is constructed, the acceleration instruction $\ddot{q}_{opt}$ at the joint can be solved, and then the velocity instruction $\dot{q}_{opt}$ at the joint and the position instruction $q_{opt}$ at the joint can be obtained through numerical integration. In addition, the torque instruction $\tau_{opt}$ of the joint can be calculated by combining the dynamics model. If the QP problem at the velocity level is constructed, the position instruction $q_{opt}$ of the joint can be obtained by numerical integration.

Afterwards, the obtained joint control instruction may be sent to the corresponding joint according to the joint drive control type. For example, for pure force-controlled joints, the calculated torque instruction $\tau_{opt}$ of the joint can be sent; for pure position-controlled joints, the calculated position instruction $q_{opt}$ of the joint can be sent; for joint drivers with velocity feedforward and torque feedforward interfaces, the calculated the velocity instruction $\dot{q}_{opt}$ and torque instruction $\tau_{opt}$ of the joint can be sent, thereby improving the accuracy and efficiency of robot control.

It can be understood that the above-mentioned steps 101-104 can be executed in each control cycle, so as to realize the motion control of the joints of the robot in each control cycle until the execution of each task of the robot is completed.

It can be seen from the forgoing that in this embodiment, the solving of the control instruction is realized by using the recursive hierarchical projection matrix instead of the null space projection matrix in the prior art. When performing simple actions which uses a fixed priority level for each task, since the recursive hierarchical projection matrix is consistent with the mathematical essence of the null-space projection matrix, the same control effect can be obtained; and when performing complex actions which uses a varied priority level for each task, the recursive hierarchical projection matrix can change continuously according to the change of the priority level of each task, thus ensuring the continuous change of the degree of freedom matched to the task in the constructed quadratic programming problem, thereby achieving a better control effect.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 2:
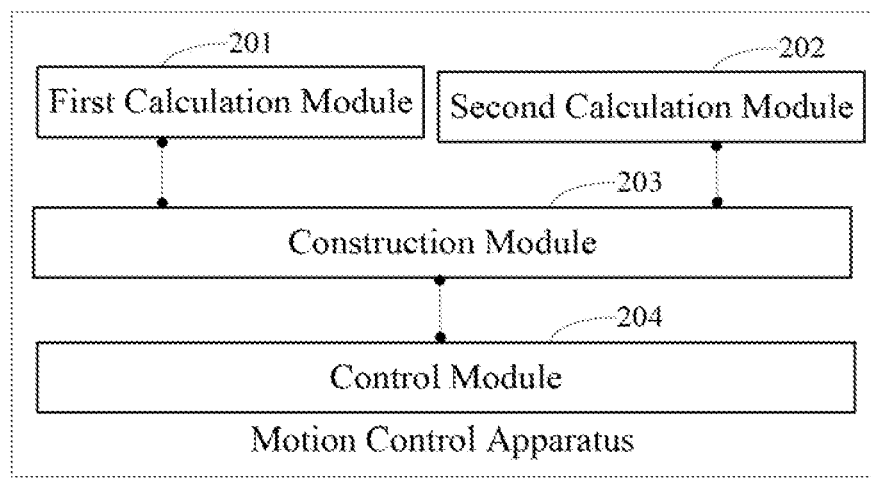
FIG. 2 is a schematic block diagram of the structure of a motion control apparatus according to an embodiment of the present disclosure.
Figure 3:
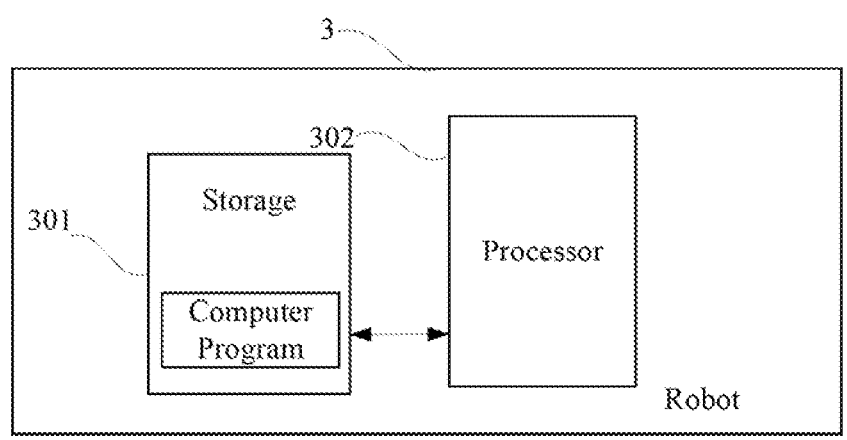
FIG. 3 is a schematic diagram of the structure of a robot according to an embodiment of the present disclosure.

FIG. 2 is a schematic block diagram of the structure of a motion control apparatus according to an embodiment of the present disclosure. In this embodiment, a motion control apparatus 20 corresponding to the above-mentioned motion control method that is for a robot such as the robot shown in FIG. 3 is provided. As shown in FIG. 2, in this embodiment, the motion control apparatus 200 may include:

a first calculation module 201 configured to calculate a task matrix and expected information of each task of the above-mentioned robot based on reference trajectory information of each task of the above-mentioned robot in a control period and state estimation information of each task of the above-mentioned robot in the above-mentioned control period;

a second calculation module 202 configured to calculate a constraint matrix and a boundary of an inequality constraint that the above-mentioned robot needs to satisfy based on the above-mentioned state estimation information;

a construction module 203 configured to construct a hierarchical quadratic programming problem with recursive hierarchical projection based on the above-mentioned task matrix of each task, the above-mentioned expected information of each task, the above-mentioned constraint matrix of the inequality constraint, the above-mentioned boundary of the inequality constraint, a real-time determined weight coefficient of each task, and a real-time determined priority level of each task; and a control module 204 configured to solve the above-mentioned hierarchical quadratic programming problem to obtain a result, and generate a joint control instruction based on the result, where the above-mentioned joint control instruction is for controlling each joint of the above-mentioned robot to move.

In one embodiment, the above-mentioned construction module 203 may include:

a task priority matrix determining unit configured to determine a task priority matrix through the real-time determined priority level of each task; and a hierarchical quadratic programming problem constructing unit configured to construct the hierarchical quadratic programming problem with recursive hierarchical projection based on the above-mentioned task matrix of each task, the above-mentioned expected information of each task, the above-mentioned constraint matrix of the inequality constraint, the above-mentioned boundary of the inequality constraint, the above-mentioned real-time determined weight coefficient of each task, and the above-mentioned task priority matrix.

In one embodiment, an expression of the task priority matrix may be:

$$\Psi = \begin{bmatrix} \alpha_{1,1} & & \alpha_{1,n_t} \\ & \ddots & \\ \alpha_{n_1,1} & & \alpha_{n_1,n_t} \end{bmatrix} \in R^{n_1 \times n_t};$$

where, $n_l$ is a number of priority levels, $n_t$ is a number of tasks, a value range of elements in the task priority matrix is [0, 1], and $$\alpha_{k,j} \begin{cases} = 0, k < i \\ = 1, k \geq i \end{cases}$$

when the priority level of the j-th task is i.

In one embodiment, the above-mentioned task priority matrix determining unit may be specifically configured to, in response to the priority level of the j-th task being raised from the i-th layer to the k-th layer, set all the elements from the k-th row to the i−1-th row in the j-th column of the above-mentioned task priority matrix to change smoothly from 0 to 1 within a preset duration; in response to the priority level of the j-th task being lowered from the i-th layer to the k-th layer, set all the elements from the i-th row to the k−1-th row in the j-th column of the above-mentioned task priority matrix to change smoothly from 1 to 0 within the above-mentioned preset duration; in response to the j-th task being removed from the i-th row, set all the elements from the i-th row to the $n_1$-th row in the j-th column of the task priority matrix to change smoothly from 1 to 0 within the preset duration; and in response to the j-th task being inserted into the i-th row, set all the elements from the i-th row to the $n_l$-th row in the j-th column of the above-mentioned task priority matrix to change smoothly from 0 to 1 within the above-mentioned preset time period.

In one embodiment, for the above-mentioned hierarchical quadratic programming problem, an optimization result of the first i layer of an optimization problem may be expressed as:

$$x_i^* = \begin{cases} P_{i-1} u_i^*, (i = 1) \\ x_{i-1}^* + P_{i-1} u_i^*, (i = 2, \ldots, n_l) \end{cases};$$

where, $x_i^*$ represents the optimization result of the first i layer of the optimization problem; $x_{i-1}^*$ represents the optimization result of the first i−1 layer of the optimization problem; $P_{i-1} u_i^*$ represents an increment of the optimization result of the first i layer of the optimization problem with respect to the optimization result of the first i−1 layer of the optimization problem.

In one embodiment, the above-mentioned $P_{i-1} u_i^*$ is obtained by solving the i-th layer of the hierarchical quadratic programming problem, and an expression of the i-th layer of the hierarchical quadratic programming problem may be:

$$\min_{u_i, v_i} \left\| A_i^{A,s}(x_{i-1}^* + P_{i-1} u_i) - \hat{b}_i^{A,s} \right\|_{\hat{W}_i^{A,s}}^2 + \|v_i\|^2$$

$$\text{s.t.} \quad \underline{d}_i^A \leq C_i^A(x_{i-1}^* + P_{i-1} u_i) + v_i \leq \overline{d}_i^A$$

$$\underline{d}_{i-1}^A \leq C_{i-1}^A(x_{i-1}^* + P_{i-1} u_i) + v_{i-1}^* \leq \overline{d}_{i-1}^A$$

$$\vdots$$

$$\underline{d}_1^A \leq C_1^A(x_{i-1}^* + P_{i-1} u_i) + v_1^* \leq \overline{d}_1^A,$$

where, $u_i$ represents an optimization variable; $v_i$ represents a slack variable; $A_i^{A,s}$ represents an augmented task matrix of the i-th layer, which is determined through the above-mentioned task matrix and the above-mentioned real-time determined priority level of each task; $P_{i-1}$ represents a recursive hierarchical projection matrix of the i-th layer; $\hat{b}_i^{A,s}$ represents a modified augmented expected information of the i-th layer, which is determined through the expected information and the above-mentioned real-time determined priority level of each task; $\hat{W}_i^{A,s}$ represents a modified augmented weight matrix of the i-th layer, which is determined through the above-mentioned real-time determined weight coefficient of each task and the above-mentioned real-time determined priority level of each task; $C_i^A$ represents an augmented constraint matrix of the i-th layer, which is determined through the above-mentioned constraint matrix and a priority level of each preset inequality constraint; $\underline{d}_i^A$ and $\overline{d}_i^A$ represents augmented boundary matrices of the i-th level, which are determined through the above-mentioned boundary of the inequality constraint and the above-mentioned priority level of the preset inequality constraint.

In one embodiment, the above-mentioned motion control apparatus 200 may further include a reference trajectory information obtaining module and a state estimation information obtaining module. In which, the above-mentioned reference trajectory information obtaining module is configured to obtain a motion plan of a host computer of the above-mentioned robot; and determine the reference trajectory information of each task of the above-mentioned robot in the control period according to the above-mentioned motion plan. The above-mentioned state estimation information obtaining module is configured to obtain real-time status feedback information of the above-mentioned robot through a sensor of the above-mentioned robot; and obtain the state estimation information of each task of the above-mentioned robot in the above-mentioned control period according to forward kinematics, a preset dynamic model, and the above-mentioned real-time state feedback information.

It can be seen from the forgoing that in this embodiment, the solving of the control instruction is realized by using the recursive hierarchical projection matrix instead of the null space projection matrix in the prior art. When performing simple actions which uses a fixed priority level for each task, since the recursive hierarchical projection matrix is consistent with the mathematical essence of the null-space projection matrix, the same control effect can be obtained; and when performing complex actions which uses a varied priority level for each task, the recursive hierarchical projection matrix can change continuously according to the change of the priority level of each task, thus ensuring the continuous change of the degree of freedom matched to the task in the constructed quadratic programming problem, thereby achieving a better control effect.

It should be noted that the information exchange, execution process and others between the modules/units in the above-mentioned apparatus are based on the same concept as the method embodiment of the present disclosure, and the specific functions and technical effects brought by them can be found in the method embodiment for details, which will not be repeated herein.

FIG. 3 is a schematic diagram of the structure of a robot according to an embodiment of the present disclosure. In this embodiment, a robot 3 is provided. As shown in FIG. 3, in this embodiment, the robot 3 may include a storage 301, one or more processors 302 (only one is shown in FIG. 3), and a computer program that is stored in storage 301 and executable on the processors 302. The storage 301 is configured to store software programs and units, and the processor 302 executes various functional applications and data processing by executing the software programs and units stored in the storage 301. Specifically, the processor 302 may implement the following steps by executing the above-mentioned computer program stored in the storage 301:

calculating a task matrix and expected information of each task of the above-mentioned robot based on reference trajectory information of each task of the above-mentioned robot in a control period and state estimation information of each task of the above-mentioned robot in the above-mentioned control period;

calculating a constraint matrix and a boundary of an inequality constraint that the above-mentioned robot needs to satisfy based on the above-mentioned state estimation information;

constructing a hierarchical quadratic programming problem with recursive hierarchical projection based on the above-mentioned task matrix of each task, the above-mentioned expected information of each task, the above-mentioned constraint matrix of the inequality constraint, the above-mentioned boundary of the inequality constraint, a real-time determined weight coefficient of each task, and a real-time determined priority level of each task; and solving the above-mentioned hierarchical quadratic programming problem to obtain a result, and generate a joint control instruction based on the result, where the above-mentioned joint control instruction is for controlling each joint of the above-mentioned robot to move.

Assuming that the above is the first possible implementation, in the second possible implementation provided based on the first possible implementation, the constructing the hierarchical quadratic programming problem with recursive hierarchical projection based on the above-mentioned task matrix of each task, the above-mentioned expected information of each task, the above-mentioned constraint matrix of the inequality constraint, the above-mentioned boundary of the inequality constraint, the real-time determined weight coefficient of each task, and a real-time determined priority level of each task may include:

determine a task priority matrix through the real-time determined priority level of each task; and a hierarchical quadratic programming problem constructing unit configured to construct the hierarchical quadratic programming problem with recursive hierarchical projection based on the above-mentioned task matrix of each task, the above-mentioned expected information of each task, the above-mentioned constraint matrix of the inequality constraint, the above-mentioned boundary of the inequality constraint, the above-mentioned real-time determined weight coefficient of each task, and the above-mentioned task priority matrix.

In the third possible implementation provided on the basis of the above-mentioned second possible implementation, an expression of the task priority matrix may be:

$$\Psi = \begin{bmatrix} \alpha_{1,1} & & \alpha_{1,n_t} \\ & \ddots & \\ \alpha_{n_1,1} & & \alpha_{n_1,n_t} \end{bmatrix} \in R^{n_1 \times n_t};$$

where, $n_l$ is a number of priority levels, $n_t$, is a number of tasks, a value range of elements in the task priority matrix is [0, 1], and $$a_{k,j} \begin{cases} = 0, k < i \\ = 1, k \geq i \end{cases}$$

when the priority level of the j-th task is i.

In the fourth possible implementation provided on the basis of the above-mentioned second possible implementation, the determining the task priority matrix through the real-time determined priority level of each task may include in response to the priority level of the j-th task being raised from the i-th layer to the k-th layer, setting all the elements from the k-th row to the i−1-th row in the j-th column of the above-mentioned task priority matrix to change smoothly from 0 to 1 within a preset duration;

in response to the priority level of the j-th task being lowered from the i-th layer to the k-th layer, setting all the elements from the i-th row to the k−1-th row in the j-th column of the above-mentioned task priority matrix to change smoothly from 1 to 0 within the above-mentioned preset duration;

in response to the j-th task being removed from the i-th row, setting all the elements from the i-th row to the n-th row in the j-th column of the task priority matrix to change smoothly from 1 to 0 within the preset duration; and in response to the j-th task being inserted into the i-th row, setting all the elements from the i-th row to the $n_1$-th row in the j-th column of the above-mentioned task priority matrix to change smoothly from 0 to 1 within the above-mentioned preset time period.

In the fifth possible implementation based on the above-mentioned first possible implementation, for the hierarchical quadratic programming problem, an optimization result of the first i layer of an optimization problem may be expressed as:

$$x_i^* = \begin{cases} P_{i-1} u_i^*, (i = 1) \\ x_{i-1}^* + P_{i-1} u_i^*, (i = 2, \ldots, n_t) \end{cases};$$

where, $x_i^*$ represents the optimization result of the first i layer of the optimization problem; $x_{i-1}^*$ represents the optimization result of the first i−1 layer of the optimization problem; $P_{i-1} u_i^*$ represents an increment of the optimization result of the first i layer of the optimization problem with respect to the optimization result of the first i−1 layer of the optimization problem.

In the sixth possible implementation provided on the basis of the above-mentioned fifth possible implementation, $P_{i-1} u_i^*$ is obtained by solving the i-th layer of the hierarchical quadratic programming problem, and an expression of the i-th layer of the hierarchical quadratic programming problem may be:

$$\min_{u_i, v_i} \left\| A_i^{A,s}(x_{i-1}^* + P_{i-1} u_i) - \hat{b}_i^{A,s} \right\|_{\hat{W}_i^{A,s}}^2 + \|v_i\|^2$$

$$\text{s.t.} \quad \underline{d}_i^A \leq C_i^A(x_{i-1}^* + P_{i-1} u_i) + v_i \leq \overline{d}_i^A$$

$$\underline{d}_{i-1}^A \leq C_{i-1}^A(x_{i-1}^* + P_{i-1} u_i) + v_{i-1}^* \leq \overline{d}_{i-1}^A$$

$$\vdots$$

$$\underline{d}_1^A \leq C_1^A(x_{i-1}^* + P_{i-1} u_i) + v_1^* \leq \overline{d}_1^A,$$

where, $u_i$ represents an optimization variable; $v_i$ represents a slack variable; $A_i^{A,s}$ represents an augmented task matrix of the i-th layer, which is determined through the task matrix and the real-time determined priority level of each task; $P_{i-1}$ represents a recursive hierarchical projection matrix of the i-th layer; $\hat{b}_i^{A,s}$ represents a modified augmented expected information of the i-th layer, which is determined through the expected information and the real-time determined priority level of each task; $\hat{W}_i^{A,s}$ represents a modified augmented weight matrix of the i-th layer, which is determined through the real-time determined weight coefficient of each task and the real-time determined priority level of each task; $C_i^A$ represents an augmented constraint matrix of the i-th layer, which is determined through the constraint matrix and a priority level of each preset inequality constraint; $\underline{d}_i^A$ and $\overline{d}_i^A$ represents an augmented boundary matrix of the i-th level, which is determined through the boundary of the inequality constraint and the priority level of the preset inequality constraint.

In the seventh possible implementation provided on the basis of the above-mentioned first possible implementation, the above-mentioned second possible implementation, the above-mentioned third possible implementation, the above-mentioned fourth possible implementation, the above-mentioned fifth possible implementation, or the above-mentioned sixth possible implementation, the above-mentioned reference trajectory information may be obtained by:

obtaining a motion plan of a host computer of the robot; and determining the reference trajectory information of each task of the robot in the control period according to the motion plan;

where the state estimation information may be obtained by:

obtaining real-time status feedback information of the robot through a sensor of the robot; and obtaining the state estimation information of each task of the robot in the control period according to forward kinematics, a preset dynamic model, and the real-time state feedback information.

It should be understood that, in this embodiment, the processor 302 may be a CPU (central processing unit). The processor may also be other general-purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 301 may include read only memory and random access memory, and provide instructions and data to processor 302. Part or entire of the storage 301 may also include non-volatile random access memory. For example, the storage 301 may also store information of device type.

It can be seen from the forgoing that in this embodiment, the solving of the control instruction is realized by using the recursive hierarchical projection matrix instead of the null space projection matrix in the prior art. When performing simple actions which uses a fixed priority level for each task, since the recursive hierarchical projection matrix is consistent with the mathematical essence of the null-space projection matrix, the same control effect can be obtained; and when performing complex actions which uses a varied priority level for each task, the recursive hierarchical projection matrix can change continuously according to the change of the priority level of each task, thus ensuring the continuous change of the degree of freedom matched to the task in the constructed quadratic programming problem, thereby achieving a better control effect.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of external device software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

When the integrated unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of this embodiment, and should be included within the scope of the present disclosure.

What is claimed is:

1. A computer-implemented motion control method for a robot, comprising:

calculating a task matrix and expected information of each task of the robot based on reference trajectory information of each task of the robot in a control period and state estimation information of each task of the robot in the control period;

calculating a constraint matrix and a boundary of an inequality constraint that the robot needs to satisfy based on the state estimation information;

constructing a hierarchical quadratic programming problem with recursive hierarchical projection based on the task matrix of each task, the expected information of each task, the constraint matrix of the inequality constraint, the boundary of the inequality constraint, a real-time determined weight coefficient of each task, and a real-time determined priority level of each task; and solving the hierarchical quadratic programming problem to obtain a result, and generating a joint control instruction based on the result, wherein the joint control instruction is for controlling each joint of the robot to move.

2. The method of claim 1, wherein the constructing the hierarchical quadratic programming problem with recursive hierarchical projection based on the task matrix of each task, the expected information of each task, the constraint matrix of the inequality constraint, the boundary of the inequality constraint, the real-time determined weight coefficient of each task, and the real-time determined priority level of each task comprises:

determining a task priority matrix through the real-time determined priority level of each task; and constructing the hierarchical quadratic programming problem with recursive hierarchical projection based on the task matrix of each task, the expected information of each task, the constraint matrix of the inequality constraint, the boundary of the inequality constraint, the real-time determined weight coefficient of each task, and the task priority matrix.

3. The method of claim 2, wherein an expression of the task priority matrix is:

$$\Psi = \begin{bmatrix} \alpha_{1,1} & & \alpha_{1,n_t} \\ & \ddots & \\ \alpha_{n_1,1} & & \alpha_{n_1,n_t} \end{bmatrix} \in R^{n_1 \times n_t};$$

where, $n_l$ is a number of priority levels, $n_t$ is a number of tasks, a value range of elements in the task priority matrix is [0, 1], and $$a_{k,j} \begin{cases} = 0, k < i \\ = 1, k \geq i \end{cases}$$

when the priority level of the j-th task is i.

4. The method of claim 2, wherein the determining the task priority matrix through the real-time determined priority level of each task comprises:

in response to the priority level of the j-th task being raised from the i-th layer to the k-th layer, setting all the elements from the k-th row to the i−1-th row in the j-th column of the task priority matrix to change smoothly from 0 to 1 within a preset duration;

in response to the priority level of the j-th task being lowered from the i-th layer to the k-th layer, setting all the elements from the i-th row to the k−1-th row in the j-th column of the task priority matrix to change smoothly from 1 to 0 within the preset duration;

in response to the j-th task being removed from the i-th row, setting all the elements from the i-th row to the $n_t$-th row in the j-th column of the task priority matrix to change smoothly from 1 to 0 within the preset duration; and in response to the j-th task being inserted into the i-th row, setting all the elements from the i-th row to the $n_t$-th row in the j-th column of the task priority matrix to change smoothly from 0 to 1 within the preset time period.

5. The method of claim 1, wherein for the hierarchical quadratic programming problem, an optimization result of the first i layer of an optimization problem is expressed as:

$$x_i^* = \begin{cases} P_{i-1} u_i^*, & (i = 1) \\ x_{i-1}^* + P_{i-1} u_i^*, & (i = 2, \ldots, n_t) \end{cases};$$

where, $x_i^*$ represents the optimization result of the first i layer of the optimization problem; $x_{i-1}^*$ represents the optimization result of the first i−1 layer of the optimization problem; $P_{i-1} u_i^*$ represents an increment of the optimization result of the first i layer of the optimization problem with respect to the optimization result of the first i−1 layer of the optimization problem.

6. The method of claim 5, wherein $P_{i-1} u_i^*$ is obtained by solving the i-th layer of the hierarchical quadratic programming problem, and an expression of the i-th layer of the hierarchical quadratic programming problem is:

$$\min_{u_i, v_i} \left\| A_i^{A,s}(x_{i-1}^* + P_{i-1} u_i) - \hat{b}_i^{A,s} \right\|_{\hat{W}_i^{A,s}}^2 + \|v_i\|^2$$

$$\text{s.t.} \quad \underline{d}_i^A \le C_i^A(x_{i-1}^* + P_{i-1} u_i) + v_i \le \overline{d}_i^A$$

$$\underline{d}_{i-1}^A \le C_{i-1}^A(x_{i-1}^* + P_{i-1} u_i) + v_{i-1}^* \le \overline{d}_{i-1}^A$$

$$\vdots$$

$$\underline{d}_1^A \le C_1^A(x_{i-1}^* + P_{i-1} u_i) + v_1^* \le \overline{d}_1^A,$$

where, $u_i$ represents an optimization variable; $v_i$ represents a slack variable; $A_i^{A,s}$ represents an augmented task matrix of the i-th layer, which is determined through the task matrix and the real-time determined priority level of each task; $P_{i-1}$ represents a recursive hierarchical projection matrix of the i-th layer; $\hat{b}_i^{A,s}$ represents a modified augmented expected information of the i-th layer, which is determined through the expected information and the real-time determined priority level of each task; $\hat{W}_i^{A,s}$ represents a modified augmented weight matrix of the i-th layer, which is determined through the real-time determined weight coefficient of each task and the real-time determined priority level of each task; $C_i^A$ represents an augmented constraint matrix of the i-th layer, which is determined through the constraint matrix and a priority level of each preset inequality constraint; $\underline{d}_i^A$ and $\overline{d}_i^A$ represents augmented boundary matrices of the i-th level, which are determined through the boundary of the inequality constraint and the priority level of the preset inequality constraint.

7. The method of claim 1, wherein the reference trajectory information is obtained by:

obtaining a motion plan of a host computer of the robot; and determining the reference trajectory information of each task of the robot in the control period according to the motion plan;

wherein the state estimation information is obtained by:

obtaining real-time status feedback information of the robot through a sensor of the robot; and obtaining the state estimation information of each task of the robot in the control period according to forward kinematics, a preset dynamic model, and the real-time state feedback information.

8. A robot, comprising:

one or more joints;

a processor;

a memory coupled to the processor; and one or more computer programs stored in the memory and executable on the processor;

wherein, the one or more computer programs comprise:

instructions for calculating a task matrix and expected information of each task of the robot based on reference trajectory information of each task of the robot in a control period and state estimation information of each task of the robot in the control period;

instructions for calculating a constraint matrix and a boundary of an inequality constraint that the robot needs to satisfy based on the state estimation information;

instructions for constructing a hierarchical quadratic programming problem with recursive hierarchical projection based on the task matrix of each task, the expected information of each task, the constraint matrix of the inequality constraint, the boundary of the inequality constraint, a real-time determined weight coefficient of each task, and a real-time determined priority level of each task; and instructions for solving the hierarchical quadratic programming problem to obtain a result, and generating a joint control instruction based on the result to send to one or more of the joints, wherein the joint control instruction is for controlling each of the joints to move.

9. The robot of claim 8, wherein the instructions for constructing the hierarchical quadratic programming problem with recursive hierarchical projection based on the task matrix of each task, the expected information of each task, the constraint matrix of the inequality constraint, the boundary of the inequality constraint, the real-time determined weight coefficient of each task, and the real-time determined priority level of each task comprise:

instructions for determining a task priority matrix through the real-time determined priority level of each task; and instructions for constructing the hierarchical quadratic programming problem with recursive hierarchical projection based on the task matrix of each task, the expected information of each task, the constraint matrix of the inequality constraint, the boundary of the inequality constraint, the real-time determined weight coefficient of each task, and the task priority matrix.

10. The robot of claim 9, wherein an expression of the task priority matrix is:

$$\Psi = \begin{bmatrix} \alpha_{1,1} & & \alpha_{1,n_t} \\ & \ddots & \\ \alpha_{n_t,1} & & \alpha_{n_1,n_1} \end{bmatrix} \in R^{n_1 \times n_t};$$

where, $n_l$ is a number of priority levels, $n_t$ is a number of tasks, a value range of elements in the task priority matrix is [0, 1], and $$a_{k,j} \begin{cases} = 0, k < i \\ = 1, k \geq i \end{cases}$$

when the priority level of the j-th task is i.

11. The robot of claim 9, wherein the instructions for determining the task priority matrix through the real-time determined priority level of each task comprise:

instructions for in response to the priority level of the j-th task being raised from the i-th layer to the k-th layer, setting all the elements from the k-th row to the i−1-th row in the j-th column of the task priority matrix to change smoothly from 0 to 1 within a preset duration;

instructions for in response to the priority level of the j-th task being lowered from the i-th layer to the k-th layer, setting all the elements from the i-th row to the k−1-th row in the j-th column of the task priority matrix to change smoothly from 1 to 0 within the preset duration;

instructions for in response to the j-th task being removed from the i-th row, setting all the elements from the i-th row to the $n_1$-th row in the j-th column of the task priority matrix to change smoothly from 1 to 0 within the preset duration; and instructions for in response to the j-th task being inserted into the i-th row, setting all the elements from the i-th row to the $n_1$-th row in the j-th column of the task priority matrix to change smoothly from 0 to 1 within the preset time period.

12. The robot of claim 8, wherein for the hierarchical quadratic programming problem, an optimization result of the first i layer of an optimization problem is expressed as:

$$x_i^* = \begin{cases} P_{i-1} u_i^*, (i = 1) \\ x_{i-1}^* + P_{i-1} u_i^*, (i = 2, \ldots, n_t) \end{cases};$$

where, $x_i^*$ represents the optimization result of the first i layer of the optimization problem; $x_{i-1}^*$ represents the optimization result of the first i−1 layer of the optimization problem; $P_{i-1} u_i^*$ represents an increment of the optimization result of the first i layer of the optimization problem with respect to the optimization result of the first i−1 layer of the optimization problem.

13. The robot of claim 12, wherein $P_{i-1} u_i^*$ is obtained by solving the i-th layer of the hierarchical quadratic programming problem, and an expression of the i-th layer of the hierarchical quadratic programming problem is:

$$\min_{u_i, v_i} \left\| A_i^{A,s}(x_{i-1}^* + P_{i-1} u_i) - \hat{b}_i^{A,s} \right\|_{\hat{W}_i^{A,s}}^2 + \|v_i\|^2$$

$$\text{s.t.} \quad \underline{d}_i^A \leq C_i^A(x_{i-1}^* + P_{i-1} u_i) + v_i \leq \overline{d}_i^A$$
$$\underline{d}_{i-1}^A \leq C_{i-1}^A(x_{i-1}^* + P_{i-1} u_i) + v_{i-1}^* \leq \overline{d}_{i-1}^A$$
$$\vdots$$
$$\underline{d}_1^A \leq C_1^A(x_{i-1}^* + P_{i-1} u_i) + v_1^* \leq \overline{d}_1^A,$$

where, $u_i$ represents an optimization variable, $v_i$ represents a slack variable; $A_i^{A,s}$ represents an augmented task matrix of the i-th layer, which is determined through the task matrix and the real-time determined priority level of each task; $P_{i-1}$ represents a recursive hierarchical projection matrix of the i-th layer; $\hat{b}_i^{A,s}$ represents a modified augmented expected information of the i-th layer, which is determined through the expected information and the real-time determined priority level of each task; $\hat{W}_i^{A,s}$ represents a modified augmented weight matrix of the i-th layer, which is determined through the real-time determined weight coefficient of each task and the real-time determined priority level of each task; $C_i^A$ represents an augmented constraint matrix of the i-th layer, which is determined through the constraint matrix and a priority level of each preset inequality constraint; $\underline{d}_i^A$ and $\overline{d}_i^A$ represents augmented boundary matrices of the i-th level, which are determined through the boundary of the inequality constraint and the priority level of the preset inequality constraint.

14. The robot of claim 8, wherein the reference trajectory information is obtained by:

obtaining a motion plan of a host computer of the robot; and determining the reference trajectory information of each task of the robot in the control period according to the motion plan;

wherein the state estimation information is obtained by:

obtaining real-time status feedback information of the robot through a sensor of the robot; and obtaining the state estimation information of each task of the robot in the control period according to forward kinematics, a preset dynamic model, and the real-time state feedback information.

15. A non-transitory computer-readable storage medium for storing one or more computer programs, wherein the one or more computer programs comprise:

instructions for calculating a task matrix and expected information of each task of a robot based on reference trajectory information of each task of the robot in a control period and state estimation information of each task of the robot in the control period;

instructions for calculating a constraint matrix and a boundary of an inequality constraint that the robot needs to satisfy based on the state estimation information;

instructions for constructing a hierarchical quadratic programming problem with recursive hierarchical projection based on the task matrix of each task, the expected information of each task, the constraint matrix of the inequality constraint, the boundary of the inequality constraint, a real-time determined weight coefficient of each task, and a real-time determined priority level of each task; and instructions for solving the hierarchical quadratic programming problem to obtain a result, and generating a joint control instruction based on the result, wherein the joint control instruction is for controlling each joint of the robot to move.

16. The storage medium of claim 15, wherein the instructions for constructing the hierarchical quadratic programming problem with recursive hierarchical projection based on the task matrix of each task, the expected information of each task, the constraint matrix of the inequality constraint, the boundary of the inequality constraint, the real-time determined weight coefficient of each task, and the real-time determined priority level of each task comprise:
   instructions for determining a task priority matrix through the real-time determined priority level of each task; and
   instructions for constructing the hierarchical quadratic programming problem with recursive hierarchical projection based on the task matrix of each task, the expected information of each task, the constraint matrix of the inequality constraint, the boundary of the inequality constraint, the real-time determined weight coefficient of each task, and the task priority matrix.

17. The storage medium of claim 16, wherein an expression of the task priority matrix is:

$$\Psi = \begin{bmatrix} \alpha_{1,1} & & \alpha_{1,n_t} \\ & \ddots & \\ \alpha_{n_1,1} & & \alpha_{n_1,n_t} \end{bmatrix} \in R^{n_1 \times n_t};$$

where, $n_l$ is a number of priority levels, $n_t$ is a number of tasks, a value range of elements in the task priority matrix is [0, 1], and $$a_{k,j} \begin{cases} = 0, k < i \\ = 1, k \geq i \end{cases}$$

when the priority level of the j-th task is i.

18. The storage medium of claim 16, wherein the instructions for determining the task priority matrix through the real-time determined priority level of each task comprise:
   instructions for in response to the priority level of the j-th task being raised from the i-th layer to the k-th layer, setting all the elements from the k-th row to the i−1-th row in the j-th column of the task priority matrix to change smoothly from 0 to 1 within a preset duration;
   instructions for in response to the priority level of the j-th task being lowered from the i-th layer to the k-th layer, setting all the elements from the i-th row to the k−1-th row in the j-th column of the task priority matrix to change smoothly from 1 to 0 within the preset duration;
   instructions for in response to the j-th task being removed from the i-th row, setting all the elements from the i-th row to the $n_l$-th row in the j-th column of the task priority matrix to change smoothly from 1 to 0 within the preset duration; and
   instructions for in response to the j-th task being inserted into the i-th row, setting all the elements from the i-th row to the $n_1$-th row in the j-th column of the task priority matrix to change smoothly from 0 to 1 within the preset time period.

19. The storage medium of claim 15, wherein for the hierarchical quadratic programming problem, an optimization result of the first i layer of an optimization problem is expressed as:

$$x_i^* = \begin{cases} P_{i-1} u_i^*, (i = 1) \\ x_{i-1}^* + P_{i-1} u_i^*, (i = 2, \ldots, n_t) \end{cases};$$

where, $x_i^*$ represents the optimization result of the first i layer of the optimization problem; $x_{i-1}^*$ represents the optimization result of the first i−1 layer of the optimization problem; $P_{i-1} u_i^*$ represents an increment of the optimization result of the first i layer of the optimization problem with respect to the optimization result of the first i−1 layer of the optimization problem.

20. The storage medium of claim 19, wherein $P_{i-1} u_i^*$ is obtained by solving the i-th layer of the hierarchical quadratic programming problem, and an expression of the i-th layer of the hierarchical quadratic programming problem is:

$$\min_{u_i, v_i} \left\| A_i^{A,s}(x_{i-1}^* + P_{i-1} u_i) - \hat{b}_i^{A,s} \right\|_{\hat{W}_i^{A,s}}^2 + \|v_i\|^2$$
$$\text{s.t.} \quad \underline{d}_i^A \leq C_i^A(x_{i-1}^* + P_{i-1} u_i) + v_i \leq \overline{d}_i^A$$
$$\underline{d}_{i-1}^A \leq C_{i-1}^A(x_{i-1}^* + P_{i-1} u_i) + v_{i-1}^* \leq \overline{d}_{i-1}^A \quad ;$$
$$\vdots$$
$$\underline{d}_1^A \leq C_1^A(x_{i-1}^* + P_{i-1} u_i) + v_1^* \leq \overline{d}_1^A,$$

where, $u_i$ represents an optimization variable; $v_i$ represents a slack variable; $A_i^{A,s}$ represents an augmented task matrix of the i-th layer, which is determined through the task matrix and the real-time determined priority level of each task; $P_{i-1}$ represents a recursive hierarchical projection matrix of the i-th layer; $\hat{b}_i^{A,s}$ represents a modified augmented expected information of the i-th layer, which is determined through the expected information and the real-time determined priority level of each task; $\hat{W}_i^{A,s}$ represents a modified augmented weight matrix of the i-th layer, which is determined through the real-time determined weight coefficient of each task and the real-time determined priority level of each task; $C_i^A$ represents an augmented constraint matrix of the i-th layer, which is determined through the constraint matrix and a priority level of each preset inequality constraint; $\underline{d}_i^A$ and $\overline{d}_i^A$ represents augmented boundary matrices of the i-th level, which are determined through the boundary of the inequality constraint and the priority level of the preset inequality constraint.

* * * * *